Patented Apr. 12, 1949

2,467,178

UNITED STATES PATENT OFFICE 2,467,178

PENETRATING OIL COMPOSITION

John C. Zimmer, Union, and Alan Beerbower, Westfield, N. J., assignors to Standard Oil Development Company, a corporation of Delaware No Drawing. Application December 29, 1945, Serial No. 638,428

4 Claims. (Cl. 252—49.6)

The present invention relates to an improved penetrating oil.

The instances in which nuts, bolts, machine screws and similar parts made for iron, steel or non-ferrous alloys, are used to hold parts of equipment together, are almost unlimited. Such securing means depend for their operation upon pressure and friction developed by metal to metal contact. Very often through exposure, neglect, or both, these parts become so badly corroded that they cannot be removed by ordinary means, such as wrenches, even when enough pressure is supplied to twist the bolt or screw in two. When situations like this arise it is quite common to use a penetrating oil which is spread into the threaded part, thereby, if successful, furnishing enough lubrication that the nut or machine screw may be removed without destruction. Oils of low viscosity or specially compounded oils such as acid solutions of oleic acid have been used for this purpose. When similar situations arise the parts are said to be frozen. Where heat is a contributing factor the problem becomes especially troublesome. It frequently happens that certain equipment, as, for instance, internal combustion engines, must be dismantled for repair or periodic inspection. It has been observed that when the parts are re-assembled after having been treated with ordinary penetrating oil to free them, the freezing due to corrosion is often enhanced, particularly if the parts have been subjected to any substantial degree of heat.

An object of the present invention is a composition useful as a penetrating oil of improved characteristics. Another object is the development of a penetrating oil which will withstand heat without substantially increasing the corrosion-freezing encountered with metal to metal contact. These and other objects will be apparent to those skilled in the art upon reading the following description.

It has now been found that certain organo-metallic compounds when blended with low molecular weight aromatic, chlorinated aliphatic or aliphatic ester solvents in the ratio of 1-3 volumes of organo-metallic compounds to 3-1 volumes of solvent form excellent penetrating oils. In general these organo-metallic compounds are alkyl, aryl, cyclic, oxy-alkyl, oxy-aryl, halogenated alkyl, aryl, oxy-alkyl and oxy-aryl derivatives of such metals as silicone, titanium, germanium and zirconium and polymers thereof having a viscosity of 25–1000, preferably 100–350 centistokes at 25° C. and are commonly designated as "silicone oils." Representative examples of these organo-metal compounds are dimethyl silicones, methyl phenyl silicones; ethyl butyl silicones; chlorobutyl silicones; germanium phenyl polymers; methyl cyclohexyl silicones; dicyclohexyl silicones; diphenyl silicones; hydroxy phenyl methyl silicones; phenyl ethyl silicones; phenyl propyl silicones; phenyl isopropyl silicones; tolyl butyl silicones; tolyl amyl silicones; xylyl isopropyl silicones; xylyl methyl silicones; phenyl hydroxy ethyl silicones; xylyl hydroxy propyl silicones; tolyl hydroxy propyl silicones; hydroxy phenyl hexyl silicones; phenyl stearyl silicones and phenyl oleosilicones; trichlorphenyl silicones; fluorophenyl silicones; chlorohexyl silicones; polyalkyl, polyaryl titanium derivatives.

These organo-metallic compounds are usually inert, colorless, odorless and oily liquids which possess an unusually low rate of viscosity change with temperature. They remain permanent liquids over a wide range of temperatures, are resistant to oxidation and are characterized by very low surface tension. A representative example of this type of compound has a freezing point of −40° C., specific gravity at 30° C. of 0.9634; refractive index at 30° C. of 1.4013 and a surface tension of 22.7 dynes per centimeter squared. They are miscible in low boiling aromatic hydrocarbons and chlorinated aliphatic hydrocarbons and aliphatic esters. They may be made by any one of several methods, one of which is to react a Grignard reagent with a halide of the metal and hydrolyze the resulting reaction product which is then condensed with the elimination of water. Other methods are known, some of which are described in U. S. Patents 2,258,218; 2,258,219; 2,258,220; 2,258,221; and 2,258,222.

The solvents with which the "silicone oils" are blended according to the present invention are low boiling aromatic hydrocarbons such as benzene, toluene or xylene; chlorinated aliphatic hydrocarbons such as carbon tetrachloride, ethane tetrachloride or tetrachlorethylene; or aliphatic esters containing from 5–9 carbon atoms in the molecule and boiling within the range 98°–198° C., such as isobutyl formate, butyl formate, amyl formate, octyl formate, butyl acetate, amyl acetate, hexyl acetate, ethyl propionate, amyl propionate, methyl butyrate, amyl butyrate, methyl valerate or butyl valerate. Other oiliness agents and extreme pressure additives may also be included in the compounded penetrating oil, the aromatic phosphites and phosphates such as tricresyl phosphite or tricresyl phosphate being particularly desirable and having both properties to some degree. When included, the aromatic esters of acids of phosphorus should be used in amounts from 5-33% of the composition. Additional additives which may be employed are sulfur, chlorine, sulfur-halide, phosphorus chloride or phosphide derivatives of hydrocarbons; metal soaps, phenates, xanthates, thio phosphates, mercaptides, sulfonates, dibenzyl disulfide, etc.

Having described the general aspects of the invention, the following example will serve to illustrate a more specific embodiment of the invention.

*Example*

Two nuts were placed on each of a number of 2" x ⅜" soft steel bolts and the nuts were tightened, one against the other at a torque of 180 inch pounds. The bolts were then exposed to the outside atmosphere for one week. The bolts were then brought in and 6 of them oiled with a solution of 80% naphtha and 20% oleic acid, another 6 with a solution of 50% silicone polymer oil (350 centistokes viscosity at 25° C.) and 50% amyl acetate. After standing 5 minutes, the nuts were loosened with a torque wrench. With 6 of the bolts which had not been oiled, the average torque required to loosen the nut was 143 inch pounds; the bolt which had been oiled with oleic acid and naphtha averaged 120 inch pounds and the nuts that had been oiled with silicone polymer and amyl acetate averaged 112 inch pounds to loosen them. The nuts were then re-tightened at a torque of 180 inch pounds and heated for one hour at 500–600° F. and then permitted to cool. After attaining room temperature the nuts were again oiled as before with oleic acid-naphtha and silicone polymer-amyl acetate solution, and after 5 minutes the nuts were again loosened. Those oiled with oleic acid-naphtha required an average of 187 inch pounds, whereas those oiled with silicone polymer-amyl acetate averaged 120 inch pounds.

From the foregoing it will be seen that the preferred percentage ranges of the respective ingredients are from 25% to 75% of silicone polymer oil, and from 75% to 25% of solvent, the solvent being selected from the group consisting of aromatic hydrocarbons of 6 to 9 carbon atoms, aliphatic chlorinated hydrocarbons, and aliphatic esters containing 5 to 9 carbon atoms in the molecule. In those instances where an ester of an acid of phosphorus is used, such as an aromatic phosphite or phosphate, these will be added in amounts to comprise from 5% to 33% of the composition, the other ingredients being reduced correspondingly. Thus, as noted above, a desirable composition might consist of equal parts of silicone polymer oil having a viscosity of 25 to 1,000 centistokes at 25° C. If an oiliness agent, such as an aromatic phosphite or phosphate, is used with such a composition, it might comprise as much as 33% of the total. In this case, the three ingredients would be used in substantially equal quantities.

What is claimed is:

1. A penetrating oil composition consisting essentially of 1 to 3 parts by volume of an oily silicone polymer having a viscosity between 25 and 1,000 centistokes, and 3 to 1 volumes of an aromatic hydrocarbon solvent having 6 to 9 carbon atoms and 5 to 35%, based on the total composition, of an aromatic ester selected from the group consisting of tricresyl phosphate and tricresyl phosphite as an oiliness agent.

2. Composition as in claim 1, in which the oiliness agent is tricresyl phosphate.

3. Composition as in claim 1, to which is added 5 to 33%, based upon the total composition, of tricresyl phosphite as an oiliness agent.

4. A penetrating oil composition consisting essentially of 1 to 3 parts by volume of an oily silicone polymer having a viscosity of 100 to 350 centistokes at 25° C., 3 to 1 volumes of an aromatic hydrocarbon solvent having 6 to 9 carbon atoms and 5 to 33%, based upon the total composition, of tricresyl phosphate.

JOHN C. ZIMMER.
ALAN BEERBOWER.

REFERENCES CITED

The following references are of record in the file of this patent:

UNITED STATES PATENTS

| Number    | Name     | Date          |
|-----------|----------|---------------|
| 2,041,076 | Lincoln  | May 19, 1936  |
| 2,279,001 | Metheson | Apr. 7, 1942  |
| 2,339,096 | Morgan   | Jan. 11, 1944 |
| 2,384,384 | McGregor | Sept. 4, 1945 |

OTHER REFERENCES

"Dow Corning Fluids," Dow Corning Corporation, Midland, Mich. (1945), pages 6 and 7.

"Dow Corning Plug Cock Grease," Dow Corning Corporation, Midland, Mich. (1945).